Patented Jan. 1, 1946

2,392,297

UNITED STATES PATENT OFFICE 2,392,297

METHOD OF MAKING FINELY DIVIDED GELATIN PRODUCTS

Maurice Strenitz, Chicago, Ill., assignor to Industrial Patents Corporation, Chicago, Ill., a corporation of Delaware No Drawing. Application March 6, 1942, Serial No. 433,628

8 Claims. (Cl. 99—130)

This invention relates to a method of making finely divided gelatin products and more particularly to a method which enables gelatin to be ground in conventional grinding mills, for example mills of the burr type, to produce small discrete non-adhering particles even when the gelatin product contains a substantial amount of absorbed water and which also enables substantial amounts of aqueous liquids to be mixed with finely divided gelatin without causing caking of the gelatin.

The present invention has particular utility in the preparation of gelatin desserts which usually include ground gelatin containing flavoring materials, fruit acids and sugar although other finely divided products containing gelatin may be prepared by the method of the present invention.

Gelatin is an extremely difficult material to grind even though it is thoroughly dried. It tends to heat during the grinding operation and become gummy thus making it impossible to pulverize or powder the gelatin. The problem of grinding gelatin becomes even more acute when any substantial amount of moisture or other softening material is present in the gelatin. Even the moisture absorbed by the gelatin in humid weather greatly affects the efficiency of the gelatin grinding operation.

In accordance with the present invention, gelatin, even that containing substantial amounts of water, may be quickly and efficiently ground to relatively finely divided form thus reducing the amount of drying of the gelatin necessary before grinding. The grinding of the gelatin may even be accomplished immediately after substantial amounts of aqueous liquids such as flavoring liquids have been admixed therewith. By incorporating a non-aqueous refrigerant directly into the gelatin or gelatin containing product so as to materially reduce the temperature thereof during the grinding operation, the gelatin can be easily ground either in substantially dry condition or admixed with substantial amounts of water. Such refrigerant may comprise any volatile liquid or solid which is not absorbed by the gelatin, which does not deleteriously affect the final product as by imparting a disagreeable odor or taste thereto, which is not miscible with water in the solid or liquid state and which evaporates at a rate sufficient to materially reduce the temperature during grinding. The preferred refrigerant is solid carbon dioxide but liquid carbon dioxide as well as other refrigerant liquids may be employed. Also, in accordance with the present invention, aqueous liquids may be mixed with finely divided gelatin and the resulting product dried, if desired, without causing caking or agglomeration of the particles. This is accomplished by performing the mixing in the presence of a refrigerant of the type above described.

It is therefore an object of the present invention to provide an improved process of making finely divided gelatin products in which the gelatin is maintained at a low temperature during grinding or admixture of aqueous liquid therewith.

Another object of the invention is to provide an improved process of making finely divided gelatin products in which a refrigerant is directly admixed with the gelatin during grinding or admixture thereof with aqueous liquids.

A further object of this invention is to provide an improved process of making finely divided gelatin products in which a volatile refrigerant capable of maintaining the temperature of the gelatin below the freezing point of water is incorporated directly into gelatin during grinding or mixing of finely divided gelatin with aqueous liquids.

A still further object of the invention is to provide an improved process of grinding gelatin in which solid carbon dioxide is mixed with the gelatin during the grinding operation.

Other objects and advantages of the invention will appear in the following description of preferred embodiments of the invention.

Since the process of the present invention is particularly useful in the preparation of gelatin desserts it will be described specifically with reference thereto. Gelatin desserts usually comprise finely divided gelatin containing flavoring material, fruit acids and sugar although in some cases the sugar is omitted by the manufacturer of the gelatin and added later. In order to obtain a thorough admixture of the gelatin with the flavoring material and prevent loss of flavoring material during storage, it is usually necessary to add such flavoring material to the gelatin in the form of an aqueous solution. This may be done either while the gelatin is in relatively coarse condition or after it has been reduced to finely divided form. Fruit acids are also desirably added in the same manner and in conjunction with the flavoring material. The addition of these materials in aqueous solution causes them to be more intimately associated with the gelatin so that the flavoring material is not lost by evaporation from the gelatin before use. After the fruit acids and flavoring materials have been thus added it has been necessary to dry the gelatin and one of the conventional methods has been to add the fruit acids and flavoring material in aqueous solution to relatively coarse gelatin, then dry the resulting mixture and grind the same to more finely divided form. Another method has been to relatively finely grind the gelatin, add the fruit acid and flavoring material in aqueous solution in a mixer, then dry the resulting product and again grind. In either case the final grinding operation causes heating of the gelatin in the mill and loss of flavoring material even though the gelatin is prevented from becoming gummy in the mill by drastic drying of the gelatin before grinding and employing a low throughput in the mill. Attempts to use chilled grinding members have not obviated this difficulty. The drastic drying necessary before the final grinding has also caused substantial loss of flavoring material.

By incorporating a volatile refrigerant directly into the gelatin or gelatin product during grinding, the gelatin may be ground even though it contains a substantial amount of water. Thus the fruit acids and flavoring material in aqueous solution may be added to and admixed with relatively coarse gelatin, the refrigerant then added and the resulting mixture sent directly through the mill without any drying operation. Alternatively, refrigerant can be added to the gelatin before adding the aqueous flavoring material or the refrigerant can even be added in the mill. No gumming or heating of the material in the mill is produced. The resulting finely divided product may be immediately packaged in many cases, but if necessary to lower the water content, it may be partially dried before packaging. By operating in this manner the finely divided material can be dried without causing the same to cake whereas any attempt to dry finely divided gelatin admixed with substantial amounts of water in prior processes has caused caking of the gelatin necessitating regrinding.

Also in accordance with the present invention, gelatin may be ground to finely divided form, preferably in the presence of a refrigerant as above described, and the resulting finely divided gelatin admixed with aqueous liquids containing flavoring material or fruit acids or both in any suitable type of mixing apparatus without causing caking of the material. By incorporating a refrigerant as above described into the mixture so that it is present during the mixing operation the particles do not swell or adhere and the resulting finely divided product can be immediately packaged or, if necessary or desirable, can be dried without causing caking thereof so that it can be packaged after drying and without regrinding.

As stated above, the preferred refrigerant because of its effective action, cheapness, availability and ease of employment, is solid carbon dioxide. This carbon dioxide may be crushed or otherwise reduced to relatively small particles, admixed with the gelatin with aqueous liquids and gelatin and the mixture subjected to a grinding operation in any suitable or conventional type of grinding mill used for grinding gelatin, such as a burr mill. The solid carbon dioxide maintains the mixture at a low temperature during grinding and permits the gelatin, even when containing a substantial amount of water, to be reduced to finely divided form which material can be dried, if necessary, while still maintaining its finely divided form. Alternatively the material being ground can be admixed with liquid carbon dioxide before introduction into the mill or during grinding of the material in the mill, for example by directing a spray of liquid carbon dioxide into the material being ground. Other liquid refrigerants may be employed. Examples of such liquids are methyl chloride, ethylene chloride, ethylene and refrigerants sold under the trade names Cymogen and Rhigolene. The amount of solid or liquid refrigerant required in the present process is in most cases not over 1% of the gelatin. With solid carbon dioxide no upper limit can be set since substantially any amount can be used without operating difficulties. Ordinarily it is preferred to use as small an amount as possible, however, amounts as great as 50% cause no operating difficulties although such operations are obviously not economical. With liquid refrigerants the amount required depends largely upon the rate at which the liquid evaporates but in general will not exceed 2% or 3%. Again relatively large amounts of such liquid refrigerant can be used without operating difficulties.

The important characteristics of refrigerants usable at ordinary temperatures and pressures are that they be normally in gaseous form at such temperatures and pressures and that they are capable of being reduced to a lower physical state, i. e., to solid or liquid form, by pressure or cooling or both so that they rapidly absorb heat by evaporation at ordinary temperatures and pressures. Most satisfactory results are obtained when the refrigerant in its lower physical state is not absorbed to any considerable extent by the gelatin or in case the refrigerant is employed with gelatin containing a substantial amount of water, when it is substantially immiscible with water in its lower physical state. Even less volatile refrigerants can be employed if the grinding or mixing operations are carried out under vacuum conditions. Ordinarily the employment of a vacuum is not necessary as there are a large number of substances known to the art which are gaseous at atmospheric temperatures and pressures, which can be easily reduced to a lower physical state and are otherwise suitable for use in the process of the present invention. In any event the gaseous pressure employed in the present invention should be such as to cause relatively rapid evaporation of the refrigerant.

In grinding gelatin products containing a small amount of water or substantially no water, only enough refrigerant need be used to lower the temperature of the material somewhat below room temperature, for example to 50° F. However, for products containing substantial amounts of water, for example 10% of water, the amount and nature of the refrigerant should be such as to maintain the average temperature of the mixture below the freezing point of water or any aqueous liquid present during grinding. The exact temperature required in each case will depend upon the nature of the materials admixed with the gelatin, the rapidity of the grinding operation, and the amount of moisture absorbed by the gelatin as well as the amount of moisture otherwise present in the product. In general, it is preferred to employ sufficient refrigerant to maintain the average temperature of the mixture at least slightly below the freezing point of water or any aqueous liquid added so that the particles of gelatin become coated with a thin film of frozen aqueous liquid during the grinding operation due to local liquefaction of the aqueous liquid and immediate refreezing. In most cases the amount of refrigerant need not be greater than that which will be substantially completely evaporated by the time the material being ground is discharged from the mill although greater amounts can be employed without operating difficulties. Approximately the same amount of refrigerant can be employed during mixing of an aqueous liquid with finely divided gelatin or gelatin products as is employed in grinding gelatin as above described.

One of the most important advantages of the present invention is the production of gelatin dessert having a stronger improved more natural flavor. Also the gelatin can be produced in more finely divided form so that it is more easily dissolved in water during the preparation of the dessert. Furthermore gelatin improving agents such as mono- or di-glycerides which render the gelatin even more difficult to grind can be incorporated into the gelatin and the resulting mixture ground without difficulty. Such gelatin improving agents in general tend to render the gelatin less brittle and friable thus causing the gelatin to offer resistance to grinding and producing a rise in temperature in the mill. This results in softening the added glycerides to produce a sticky mass in the mill. The use of refrigerants of the type disclosed completely solves this problem and permits a still finer grind without any of the usual difficulties. Furthermore it is not necessary to dry the gelatin to as great an extent as heretofore prior to grinding and the grinding may be carried on even in the presence of substantial amounts of water. Thus the gelatin mixture may be ground while containing as much as 30% to 50% of water and this ground material packaged or dried and packaged while it still retains its finer divided form. Also as much as 30% to 50% or more aqueous liquid can be admixed with finely divided gelatin by the process of the present invention without causing caking or agglomeration of the particles after the refrigerant has been evaporated. With the refrigerant of the present invention the grinding or mixing may be carried on either in the absence of sugar or other sweetening agent or in the presence of substantial amounts of such sweetening agents.

While I have disclosed the preferred embodiments of my invention it is understood that the details thereof may be varied within the scope of the following claims.

I claim:

1. The method of treating gelatin to prevent agglomeration of discrete particles of the gelatin when the gelatin is in contact with an aqueous medium, comprising adding volatile refrigerant to the gelatin, said refrigerant being added in an amount to lower the temperature of the gelatin to below about 50° F., and mixing an aqueous medium throughout the cooled gelatin mass, said gelatin and aqueous medium mixture containing less than about 10% moisture, said refrigerant functioning to prevent swelling of the gelatin in contact with the water whereby agglomeration is avoided.

2. The method of treating gelatin to prevent agglomeration of discrete particles of the gelatin when the gelatin is in contact with an aqueous medium, comprising adding a volatile refrigerant to the gelatin, said refrigerant being added in an amount to lower the temperature of the gelatin to below about 32° F., grinding the gelatin to a finely divided state, and mixing an aqueous medium throughout the cooled gelatin mass, said gelatin and aqueous medium mixture containing up to approximately 30 to 50% moisture, said refrigerant functioning to prevent swelling of the gelatin in contact with the water whereby agglomeration is avoided.

3. The method of treating gelatin to prevent agglomeration of discrete particles of the gelatin when the gelatin is in contact with an aqueous medium, comprising adding a volatile refrigerant to the gelatin, said refrigerant being added in an amount to lower the temperature of the gelatin to below about 32° F., mixing an aqueous medium throughout the cooled gelatin mass, said gelatin and aqueous medium mixture containing up to approximately 30 to 50% moisture, said refrigerant being insoluble and nonabsorbent in the gelatin and aqueous mixture and functioning to prevent swelling of the gelatin in contact with the water whereby agglomeration is avoided.

4. The method of treating gelatin to prevent agglomeration of discrete particles of the gelatin when the gelatin is in contact with an aqueous medium, comprising adding a volatile refrigerant to the gelatin, said refrigerant being added in an amount to lower the temperature of the gelatin to below about 32° F., grinding the gelatin to a finely divided state, and mixing an aqueous medium throughout the cooled gelatin mass, said gelatin and aqueous medium mixture containing up to approximately 30 to 50% moisture, said refrigerant being insoluble and nonabsorbent in the gelatin and aqueous mixture and functioning to prevent swelling of the gelatin in contact with the water whereby agglomeration is avoided.

5. The method of treating gelatin to prevent agglomeration of discrete particles of the gelatin when the gelatin is in contact with an aqueous medium, comprising adding a volatile refrigerant to the gelatin, said refrigerant being added in an amount to lower the temperature of the gelatin to below about 32° F., mixing an aqueous flavoring medium throughout the cooled gelatin mass, said gelatin and aqueous medium mixture containing up to approximately 30 to 50% moisture, said refrigerant functioning to prevent swelling of the gelatin in contact with the water whereby agglomeration is avoided.

6. The method of treating gelatin to prevent agglomeration of discrete particles of the gelatin when the gelatin is in contact with an aqueous medium, comprising adding a volatile refrigerant to the gelatin, said refrigerant being added in an amount to lower the temperature of the gelatin to below about 32° F., grinding the gelatin to a finely divided state, and mixing an aqueous flavoring medium throughout the cooled gelatin mass, said gelatin and aqueous medium mixture containing up to approximately 30 to 50% moisture, said refrigerant functioning to prevent swelling of the gelatin in contact with the water whereby agglomeration is avoided.

7. The method of preparing stable comminuted gelatin compositions which comprises adding to gelatin material an aqueous modifying reagent whereby the resulting composition would normally become gummy and difficult to comminute, said gelatin and aqueous medium mixture containing up to approximately 30 to 50% moisture, cooling said gelatin while adding said reagent with a solid volatile refrigerant to prevent the formation of such gumminess and then comminuting the mixture to produce a stable comminuted product, said refrigerant being added in an amount to lower the temperature of the gelatin to below about 32° F.

8. The method of preparing a finely divided and flavored gelatin powder for making desserts which comprises forming a mixture of gelatin and aqueous flavoring materials, said gelatin and aqueous medium mixture containing up to approximately 30 to 50% moisture, said mixture normally tending to become gummy, cooling said gelatin while adding said flavoring by adding to said mixture solid carbon dioxide in sufficient amount to refrigerate the mass to a temperature below 32° F., and then grinding said mixture whereby the formation of such gumminess is prevented and a stable gelatin dessert powder is obtained.

MAURICE STRENITZ.